United States Patent
Gupta et al.

(10) Patent No.: US 7,321,947 B2
(45) Date of Patent: Jan. 22, 2008

(54) SYSTEMS AND METHODS FOR MANAGING MULTIPLE HOT PLUG OPERATIONS

(75) Inventors: Saurabh Gupta, Austin, TX (US); Vijay Nijhawan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 11/077,443

(22) Filed: Mar. 10, 2005

(65) Prior Publication Data

US 2006/0206648 A1 Sep. 14, 2006

(51) Int. Cl.
*G06F 13/00* (2006.01)

(52) U.S. Cl. ..................... 710/302; 710/266
(58) Field of Classification Search ............... 710/100, 710/300–304, 266; 711/115
See application file for complete search history.

(56) References Cited

U.S. PATENT DOCUMENTS

| | | | |
|---|---|---|---|
| 5,684,997 A | 11/1997 | Kau et al. ............... | 395/733 |
| 5,784,576 A | 7/1998 | Guthrie et al. ............ | 395/283 |
| 5,943,506 A | 8/1999 | Poisner ................... | 395/868 |
| 6,058,445 A | 5/2000 | Chari et al. .............. | 710/103 |
| 6,073,199 A | 6/2000 | Cohen et al. ............. | 710/113 |
| 6,105,089 A | 8/2000 | Chari et al. .............. | 710/103 |
| 6,112,273 A | 8/2000 | Kau et al. ................ | 710/260 |
| 6,145,048 A | 11/2000 | Klein ..................... | 710/264 |
| 6,209,051 B1 | 3/2001 | Hill et al. ................ | 710/103 |
| 6,212,592 B1 | 4/2001 | Klein ..................... | 710/260 |
| 6,282,596 B1 * | 8/2001 | Bealkowski et al. ........ | 710/302 |
| 6,282,601 B1 | 8/2001 | Goodman et al. ......... | 710/260 |
| 6,338,107 B1 | 1/2002 | Neal et al. ............... | 710/103 |
| 6,363,452 B1 | 3/2002 | Lach ...................... | 710/316 |
| 6,401,157 B1 | 6/2002 | Nguyen et al. ............ | 710/302 |
| 6,418,498 B1 | 7/2002 | Martwick ................ | 710/269 |

(Continued)

FOREIGN PATENT DOCUMENTS

EP 1171824 B1 5/2003

OTHER PUBLICATIONS

PCI Hot Plug Management, retrieved from <http://publib.boulder.ibm.com/infocenter/pseries/v5r3/index.jsp?topic=/com.ibm.aix.baseadmn/doc/baseadmndita/devpcihotplugmgmt.htm>, Sep. 28, 2006.*

(Continued)

*Primary Examiner*—Khanh Dang
(74) *Attorney, Agent, or Firm*—Baker Botts L.L.P.

(57) ABSTRACT

A method for managing multiple hot plug operations in an information handling system is provided. An instruction for initiating a new hot plug operation is received, the new hot plug operation including one or more hot plug system management interrupts (SMIs). Another hot plug operation currently ongoing at the time of receiving the instruction for initiating the first hot plug operation is identified, the ongoing hot plug operation also including one or more hot plug SMIs. In response to identifying the ongoing hot plug operation, the initiation of the new hot plug operation is restricted such that the ongoing hot plug operation may be completed. For example, hot plug SMIs not related to the ongoing hot plug operation may be disabled until the ongoing hot plug operation is completed. As another example, the new hot plug operation may be queued and performed upon the completion of the ongoing hot plug operation.

16 Claims, 5 Drawing Sheets

U.S. PATENT DOCUMENTS

| | | | |
|---|---|---|---|
| 6,529,987 B1 | 3/2003 | Reid | 710/302 |
| 6,532,510 B2 | 3/2003 | Klein | 710/260 |
| 6,564,279 B1 | 5/2003 | Neil et al. | 710/302 |
| 6,578,099 B1* | 6/2003 | Bassman et al. | 710/301 |
| 6,772,263 B1 | 8/2004 | Arramreddy | 710/302 |
| 6,775,728 B2 | 8/2004 | Zimmer et al. | 710/260 |
| 6,792,494 B2 | 9/2004 | Bennett et al. | 710/302 |
| 6,996,648 B2* | 2/2006 | Vu | 710/302 |
| 7,000,102 B2 | 2/2006 | Kumar et al. | |
| 7,076,591 B2* | 7/2006 | Arramreddy | 710/302 |
| 2003/0225933 A1 | 12/2003 | Suzuki | |
| 2004/0215864 A1 | 10/2004 | Arimilli et al. | |
| 2005/0223265 A1* | 10/2005 | MacLaren et al. | 714/5 |
| 2006/0069835 A1 | 3/2006 | Arackal et al. | |

OTHER PUBLICATIONS

Great Britain Search Report and a Copy of the Citations for Application No. GB0604881.3, 4 pages, Jun. 16, 2006.

Office Action from German Application No. 102006009617.7 (10 pages).

* cited by examiner

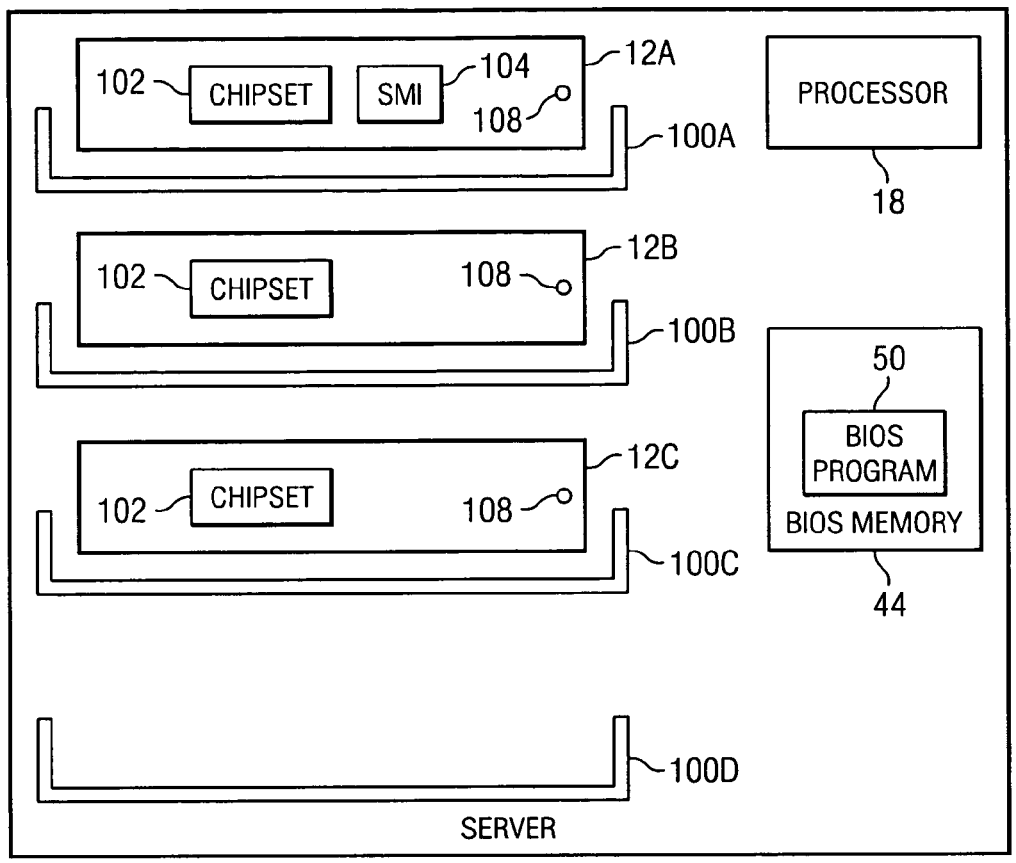
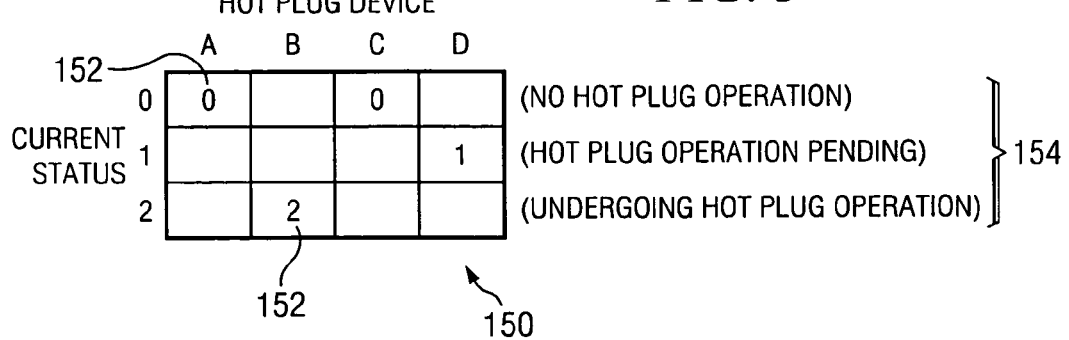

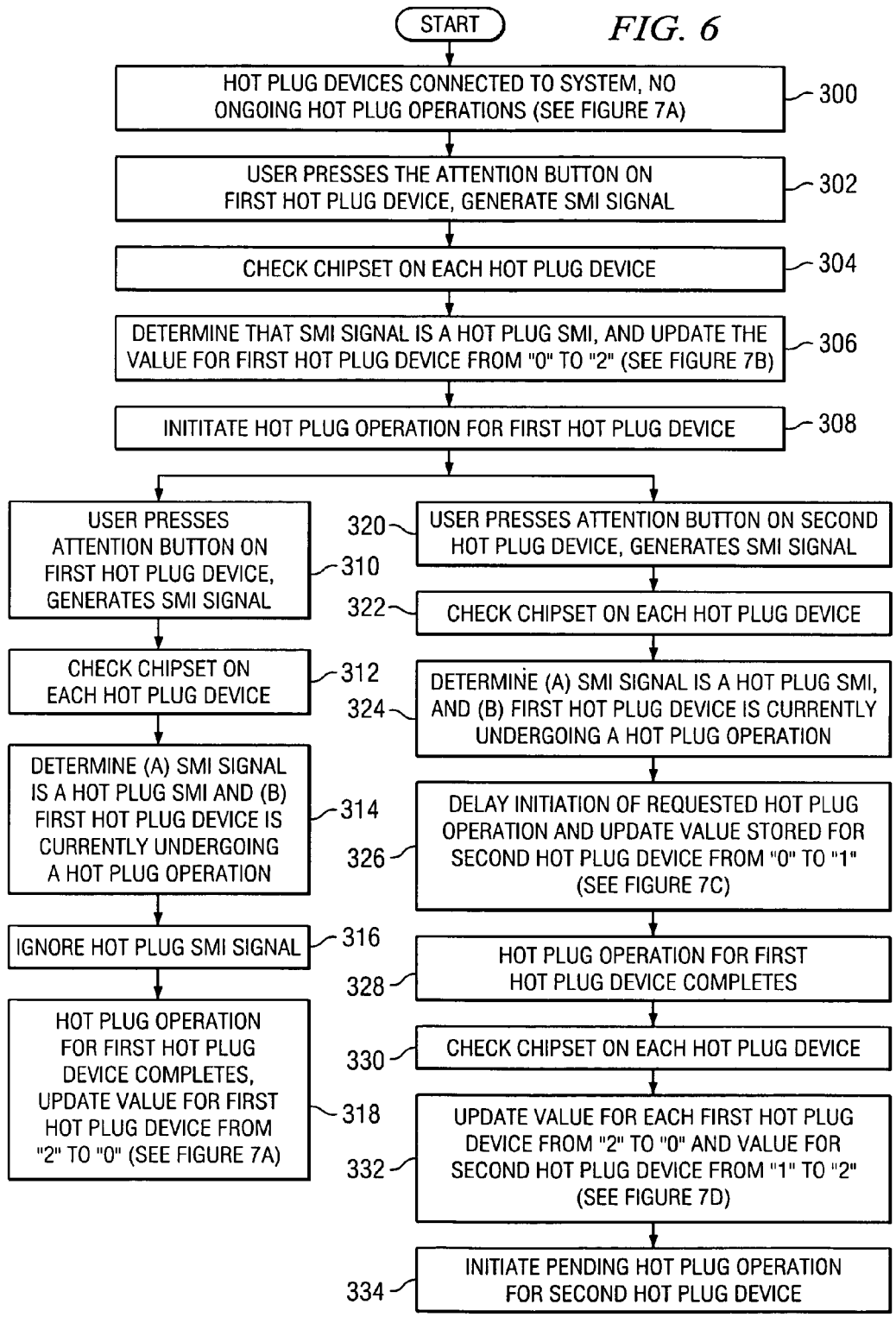

HOT PLUG DEVICE

|  | A | B | C | D |
|---|---|---|---|---|
| 0 | 0 | 0 | 0 | 0 |
| STATUS  1 |  |  |  |  |
| 2 |  |  |  |  |

*FIG. 7A*

HOT PLUG DEVICE

|  | A | B | C | D |
|---|---|---|---|---|
| 0 |  | 0 | 0 | 0 |
| STATUS  1 |  |  |  |  |
| 2 | 2 |  |  |  |

*FIG. 7B*

HOT PLUG DEVICE

|  | A | B | C | D |
|---|---|---|---|---|
| 0 |  |  | 0 | 0 |
| STATUS  1 |  | 1 |  |  |
| 2 | 2 |  |  |  |

*FIG. 7C*

HOT PLUG DEVICE

|  | A | B | C | D |
|---|---|---|---|---|
| 0 | 0 |  | 0 | 0 |
| STATUS  1 |  |  |  |  |
| 2 |  | 2 |  |  |

*FIG. 7D* ns and methods for managing multiple hot plug operations

TECHNICAL FIELD

The present disclosure relates generally to information handling systems and, more particularly, to systems and methods for managing multiple hot plug operations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems, including computer systems, support hot plug functionality for various hot plug components, external devices or peripherals, such as memory cards, PCI devices, or disk drives, for example. Hot plug, which is often referred to as hot swap, refers to the process of removing or adding a device to a system without halting, or "hanging," the system. In particular situations, hot plug may refer to adding a device to, or removing a device from, a bus while transactions involving other devices or system components are occurring over the bus.

In order to add a hot plug device to or remove a hot plug device from an information handling system, the system may need to perform a hot plug operation, which may include a series of functions, including a number of system management interrupts (SMIs). Due to such SMIs, a system can typically only handle one hot plug operation at a time. When multiple hot plug operations are requested at the same time, the system may hang or other errors may result.

SUMMARY

Therefore, a need has arisen for systems and methods for managing multiple hot plug operations that reduces or eliminates the problems associated with receiving multiple hot plug operations.

In accordance with one embodiment of the present disclosure, a method for managing multiple hot plug operations in an information handling system is provided. An instruction for initiating a new hot plug operation is received, the new hot plug operation including one or more hot plug system management interrupts (SMIs). Another hot plug operation currently ongoing at the time of receiving the instruction for initiating the first hot plug operation is identified, the ongoing hot plug operation also including one or more hot plug SMIs. In response to identifying the ongoing hot plug operation, the initiation of the new hot plug operation is restricted such that the ongoing hot plug operation may be completed. For example, hot plug SMIs not related to the ongoing hot plug operation may be disabled until the ongoing hot plug operation is completed. As another example, the new hot plug operation may be queued and performed upon the completion of the ongoing hot plug operation.

In accordance with another embodiment of the present disclosure, an information handling system includes a plurality of hot plug slots operable to receive hot plug devices, a processor, and a BIOS memory communicatively coupled to the processor and including a BIOS program. The processor and the program are operable to cooperate to receive an instruction for initiating a new hot plug operation for a particular hot plug device in a particular hot plug slot, the new hot plug operation including one or more hot plug system management interrupts (SMIs), identify another hot plug operation currently ongoing at the time of receiving the instruction for initiating the first hot plug operation, the ongoing hot plug operation including one or more hot plug SMIs, and in response to identifying the ongoing hot plug operation, restricting the initiation of the new hot plug operation such that the ongoing hot plug operation may be completed.

In accordance with yet another embodiment of the present disclosure, a computer-readable medium having computer-executable instructions for managing multiple hot plug operations in an information handling system is provided. The computer-executable instructions include instructions for identifying a received instruction for initiating a new hot plug operation, the new hot plug operation including one or more hot plug system management interrupts (SMIs), instructions for identifying another hot plug operation currently ongoing at the time of receiving the instruction for initiating the first hot plug operation, the ongoing hot plug operation including one or more hot plug SMIs, and instructions for restricting the initiation of the new hot plug operation in response to identifying the ongoing hot plug operation such that the ongoing hot plug operation may be completed.

One technical advantage of the present disclosure is that systems and methods for managing multiple hot plug operations, either from the same hot plug device or from different hot plug devices, are provided. In some situations, hot plug operations are requested by a user pressing an attention button on the relevant hot plug device, such as to add or remove that hot plug device to or from an information handling system. In particular, such systems and methods may manage a new hot plug operation (or multiple new hot plug operations) that is requested while another hot plug operation is ongoing in order to prevent system hang and to allow the ongoing hot plug operation to finish without interruption.

For example, in some embodiments, requests for new hot plug operations that are made while another hot plug operation is ongoing are ignored by the system in order to prevent system hang and to allow the ongoing hot plug operation to finish without interruption. In other embodiments, a request for a new hot plug operation (or requests for multiple new hot plug operations) that is made while another hot plug operation is ongoing are queued by the system and performed after the ongoing hot plug operation is finished. In this manner, requested hot plug operations may be maintained and performed in a suitable order, without causing system hang or other errors, and allowing ongoing hot plug operations to finish without interruption.

In particular embodiments, queued hot plug operations may be queued according to any suitable criteria, such as the time that the request for each pending hot plug operation was received, the type of the relevant hot plug device, and the slot in which the relevant hot plug device is located, for example. The system may be configured for any desired priority of hot plug operations.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a number of hot plug devices located in hot plug slots of the information handling system of FIG. 1 according to one embodiment of the disclosure;

FIG. 3 illustrates example data including values representing the current status of a plurality of hot plug devices supported by the information handling system of FIG. 1 in accordance with one embodiment of the disclosure;

FIGS. 6-7D illustrate a method of the information handling system of FIG. 1 managing multiple hot plug operations in accordance with another embodiment of the disclosure.

DETAILED DESCRIPTION

Preferred embodiments and their advantages are best understood by reference to FIGS. 1 through 7D, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
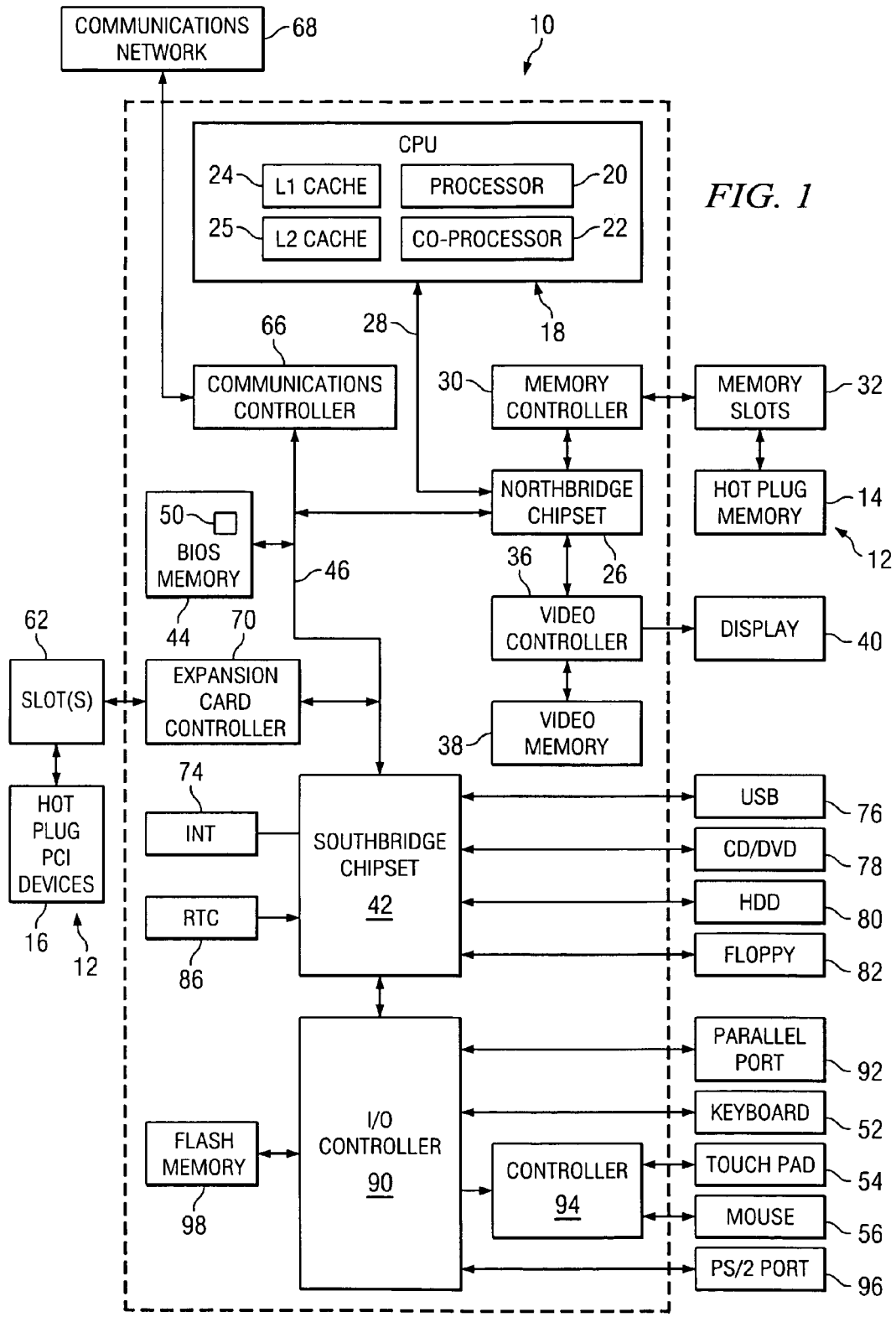
FIG. 1 illustrates an example information handling system according to one embodiment of the disclosure.

FIG. 1 illustrates an example information handling system 10 according to one embodiment of the present disclosure. As discussed in greater detail below, information handling system 10 may support one or more hot plug devices 12, such as one or more hot plug memory devices 14 and/or one or more hot plug PCI devices 16, for example. Information handling system 10 may manage multiple hot plug operations associated with such hot plug devices 12 such that hot plug operations may complete without interruption and without causing the information handling system 10 to hang or otherwise cause a system error.

Information handling system 10 or computer system preferably includes one or more microprocessors such as central processing unit (CPU) 18. CPU 18 may include processor 20 for handling integer operations and coprocessor 22 for handling floating point operations. CPU 18 is preferably coupled to cache, such as L1 24 and L2 cache 25 and a chipset, commonly referred to as Northbridge chipset 26, via a frontside bus 28. Northbridge chipset 26 preferably couples CPU 18 to memory 28 via memory controller 30. Memory controller 30 may be coupled to one or more hot plug memory slots 32, which may be configured to receive one or more hot plug memory devices 14. Hot plug memory devices 14 may include any hot pluggable memory devices, such as memory cards with memory DIMM, for example.

Information handling system 10 may include additional (non-hot plug) memory, such as random access memory (RAM), read-only memory (ROM), dynamic random access memory (DRAM), fast cycle RAM (FCRAM), static RAM (SRAM), field-programmable gate arrays (FPGA), erasable programmable read-only memory (EPROM), electrically erasable programmable read-only memory (EEPROM), or any other suitable volatile or non-volatile memory devices.

Graphics controller 36 is preferably coupled to Northbridge chipset 26 and to video memory 38. Video memory 38 is preferably operable to store information to be displayed on one or more display panels 40. Display panel 40 may be an active matrix or passive matrix liquid crystal display (LCD), a cathode ray tube (CRT) display or other display technology. In some applications, uses or instances, graphics controller 36 may also be coupled to an integrated display, such as in a portable information handling system implementation.

Northbridge chipset 26 serves as a "bridge" between CPU bus 28 and the connected buses. Generally, when going from one bus to another bus, a bridge is needed to provide the translation or redirection to the correct bus. Typically, each bus uses its own set of protocols or rules to define the transfer of data or information along the bus, commonly referred to as the bus architecture. To prevent communication problem from arising between buses, chipsets such as Northbridge chipset 26 and Southbridge chipset 42, are able to translate and coordinate the exchange of information between the various buses and/or devices that communicate through their respective bridge.

Basic input/output system (BIOS) memory 44 is also preferably coupled to a system bus 46 connecting to Southbridge chipset 42. FLASH memory or other reprogrammable, nonvolatile memory may be used as BIOS memory 44. A BIOS program 50 is typically stored in BIOS memory 44. BIOS program 50 preferably includes software which facilitates interaction with and between information handling system 10 devices such as a keyboard 52, a pointer such as a touch pad 54 or mouse 56, one or more other I/O devices, and one or more hot plug PCI devices 16 located in one or more hot plug expansion slots 62. BIOS memory 44 may also store system code operable to control a plurality of basic information handling system 10 operations.

A communication controller 66 is preferably provided and enables information handling system 10 to communicate with communication network 68, such as an Ethernet network, for example. Communication network 68 may include any local area network (LAN), metropolitan area network (MAN), wide area network (WAN), wireless local area network (WLAN), virtual private network (VPN), intranet, the Internet, or any other appropriate architecture or system that facilitates the communication of data. Communication controller 66 may be employed to form a network interface for communicating with other information handling systems (not expressly shown) coupled to communication network 68.

Information handling system may include an expansion card controller 70, which may be coupled to system bus 46 as shown. Expansion card controller 72 is coupled to a plurality of hot plug expansion slots 62, which may be configured to receive one or more hot plug PCI devices 16, such as any suitable PCI, PCI-X, or PCI-E card or device, for example.

Southbridge chipset 42, also called bus interface controller or expansion bus controller preferably couples system bus 46 to an expansion bus. In one embodiment, the expansion bus may be configured as an Industry Standard Architecture ("ISA") bus. However, other buses, such as a Peripheral Component Interconnect ("PCI") bus, for example, may be used.

An interrupt request generator 74 may also be coupled to Southbridge chipset 42. Interrupt request generator 74 is preferably operable to issue an interrupt service request over a predetermined interrupt request line in response to receipt of a request to issue interrupt instruction from CPU 18. Southbridge chipset 42 preferably interfaces to one or more universal serial bus (USB) ports 76, CD-ROM (compact disk-read only memory) or digital versatile disk (DVD) drive 78, an integrated drive electronics (IDE) hard drive device (HDD) 80 and/or a floppy disk drive (FDD) 82. In one example embodiment, Southbridge chipset 42 interfaces with HDD 80 via an IDE bus. Other disk drive devices which may be interfaced to Southbridge chipset 42 include, for example, a removable hard drive, a zip drive, a CD-RW (compact disk-read/write) drive, and a CD-DVD (compact disk—digital versatile disk) drive.

A real-time clock (RTC) 86 may also be coupled to Southbridge chipset 42. Real-time clock 86 permits timed events or alarms to be activated in the information handling system 10. Real-time clock 86 may be programmed to generate an alarm signal at a predetermined time as well as to perform other operations.

An I/O controller 90, often referred to as a super I/O controller, is also preferably coupled to Southbridge chipset 42. I/O controller 90 preferably interfaces to one or more parallel port 92, keyboard 52, a device controller 94 operable to drive and interface with touch pad 54 and/or mouse 56, and PS/2 Port 96. FLASH memory 98 or other nonvolatile memory may be used with I/O controller 90.

As discussed above, information handling system 10 may support one or more types of hot plug device 12, such as hot plug memory devices 14, hot plug PCI devices 16 and/or any other suitable types of hot plug device. Hot plug devices 12 may include any devices capable of being added to or removed from information handling system 10 by hot plug. Hot plug, which is often referred to as hot swap, refers to the process of removing or adding a device to a system without halting, or "hanging," the system. In particular situations, hot plug may refer to adding a device to, or removing a device 12 from, a bus (such as bus 28 or bus 46, for example) while transactions involving other devices or system components are occurring over the bus.

FIG. 2 is a block diagram illustrating a number of hot plug devices 12 located in hot plug slots 100 of information handling system 10 according to one embodiment of the present disclosure. In this embodiment, information handling system 10 comprises a server including four hot plug slots 32 and/or 62, indicated as slots 100A-100D, operable to receive up to four hot plug devices 12, and shown as currently housing three hot plug devices 12A-12C. In a particular embodiment, information handling system 10 comprises a four-processor (4P) server including four hot plug memory slots 32, operable to receive up to four hot plug memory devices 14. In other embodiments, information handling system 10 may comprise any system that supports and manages multiple hot plug operations (such as discussed herein) for any suitable number and/or type(s) of hot plug devices 12, such as a high-end server, for example.

As shown in FIG. 2, each hot plug device 12 includes a chipset 102 that generates system management interrupts (SMIs) associated with hot plug operations. System management interrupt (SMI) code 104 may be stored on one of the hot plug devices 12, such as hot plug device 12A, as shown in FIG. 2. SMI code 104 may be copied to hot plug device 12A from BIOS memory 50, such as during power-up of server 10, for example. In other embodiments or in a mirrored mode situation (i.e., where the contents of multiple hot plug devices 12 are mirrored, or identical), SMI code 104 may be stored on more than one hot plug device 12. For example, in a mirrored mode in which the contents of memory cards A and B are mirrored, SMI code 104 may be stored on both hot plug devices 12A and 12B.

Each hot plug device 12 may also include a hot plug operation initiation device 108 operable to be actuated in order to initiate a hot plug operation, or event, for that hot plug device 12, such as to add a hot plug device 12 to server 10 or remove a hot plug device 12 from server 10. In the particular embodiment shown in FIG. 2, each hot plug device 12 includes an attention button 108 that may be pressed by a user in order to initiate a hot plug operation for that hot plug device 12.

The hot plug operation allows the hot plug device 12 to be added to or removed from the server 10. For example, to remove a hot plug device 12 from server 10, the user presses the attention button 108 on the hot plug device 12, which initiates a hot plug operation to remove the hot plug device 12 from the server. Once the hot plug operation has completed, an indication may be displayed (such as by a light or sound, for example) to the user indicating that the hot plug operation has completed. The user may then remove the hot plug device 12 from the particular slot 100 on server 10. To add a hot plug device 12 to server 10, the user inserts the hot plug device 12 into an open slot 100 on server 10 and presses the attention button 108 on the hot plug device 12, which initiates a hot plug operation to add the hot plug device 12 to the server. Once the hot plug operation has completed, an indication may be displayed (such as by a light or sound, for example) to the user indicating that the hot plug operation has completed and the hot plug device 12 has been successfully added to server 10. A hot plug operation (either for adding and removing a hot plug device 12) may include a number (e.g. hundreds) of system management interrupts (SMIs).

Server 10 is operable to receive an instruction for initiating a new hot plug operation for a particular hot plug device 12, determine that another hot plug operation is currently ongoing at the time of receiving the instruction for initiating the first hot plug operation, and in response to determine that another hot plug operation is currently ongoing, restricting the initiation of the new hot plug operation such that the ongoing hot plug operation may be completed.

The new hot plug operation may regard the same hot plug device 12 or a different hot plug device 12 that the ongoing hot plug operation. For example, suppose a user presses the attention button 108 on a particular hot plug device 12, which initiates a hot plug operation (such as to add or remove the particular hot plug device 12). Before this hot plug operation has completed, the user (or another user) presses the attention button 108 on the particular hot plug device 12 again. Server 10 may receive an instruction generated by the second press of the attention button 108, determine that a hot plug operation is currently ongoing for that hot plug device 12, and in response, restrict the initiation of the second hot plug operation such that the first hot plug operation may be completed.

As another example, suppose a user presses the attention button 108 on a first hot plug device 12, hot plug device 12A, which initiates a hot plug operation for hot plug device 12A (such as to add or remove hot plug device 12A). Before the hot plug operation for hot plug device 12A has completed, the user (or another user) presses the attention button 108 on a second hot plug device 12, hot plug device 12B. Server 10 may receive an instruction generated by the pressing attention button 108 on hot plug device 12B, determine that a hot plug operation is currently ongoing for hot plug device 12A, and in response, restrict the initiation of the hot plug operation for hot plug device 12B such that the hot plug operation for hot plug device 12A may be completed.

In either example discussed above, restricting the initiation of a new hot plug operation due to another ongoing hot plug operation may involve any suitable functions such that the ongoing hot plug operation may be successfully completed. For example, as discussed in greater detail below with reference to FIG. 5, restricting the initiation of a new hot plug operation includes disabling hot plug SMIs from all or particular hot plug devices 12 during the ongoing hot plug operation, and re-enabling hot plug SMIs from the all or particular hot plug devices 12 after completion of the ongoing hot plug operation.

As another example, as discussed in greater detail below with reference to FIGS. 6-7, restricting the initiation of a new hot plug operation includes storing a received instruction for initiating the new hot plug operation such that the new hot plug operation is pending, and subsequently initiating the pending new hot plug operation upon or after completion of the ongoing hot plug operation.

In some embodiments, server 10 may manage a current status for each of a plurality of hot plug devices 12, which status for each hot plug device 12 may indicate (a) whether a hot plug operation is currently ongoing for that hot plug device 12 and/or (b) whether a hot plug operation is currently pending for that hot plug device 12. The current status of each of the plurality of hot plug devices is represented by one of a plurality of values, which may be stored within SMI code 104 on one or more hot plug devices 12. In a particular embodiment, such values for each hot plug device 12 include a first value indicating that a hot plug operation is currently ongoing for that hot plug device 12, a second value indicating that a hot plug operation is pending for that hot plug device 12, and a third value indicating that a hot plug operation is neither currently ongoing nor pending for that hot plug device 12.

FIG. 3 illustrates example data 150 including values 152 representing the current status 154 a plurality of hot plug devices 12 supported by information handling system 10 in accordance with one embodiment of the disclosure. Data 150 may be stored in SMI code 104 on one or more hot plug devices 12 and managed by BIOS program 50 of information handling system 10. In this embodiment, a value of "2" for a particular hot plug device 12 indicates that hot plug device 12 is currently undergoing a hot plug operation. A value of "1" indicates that a hot plug operation is pending for that hot plug device 12. A value of "0" indicates that a hot plug operation is neither currently ongoing nor pending for that hot plug device 12. It should be understood that the values 0, 1 and 2 are used merely for illustrative purposes, and any other suitable values may be used.

When no hot plug operations are ongoing or pending for any memory device 12, the value 152 for each hot plug device 12 is "0." When a hot plug operation is ongoing for a first hot plug device 12, and pending for one or more other hot plug devices 12, the value 152 for the first memory device 12 is "2" and the value 152 for each memory device 12 for which a hot plug operation is pending is "1."

In operation, when a hot plug operation is requested for a first particular hot plug device 12, such as when a user presses attention button 108 on the first particular hot plug device 12, information handling system 10 may determine whether a hot plug operation is currently ongoing for another hot plug device 12. This determination may include checking the chipset 102 on each hot plug device 12 to determine the hot plug status of each hot plug device 12. If information handling system 10 determines that a hot plug operation is currently ongoing for a second particular hot plug device 12, information handling system 10 may temporarily restrict the initiation of the requested hot plug operation for the first particular hot plug device 12 and update the status of the first particular hot plug device 12 with a value of "1" (i.e., pending hot plug operation) within data 150. Upon or after completion of the ongoing hot plug operation for the second particular hot plug device 12, information handling system 10 may identify the pending hot plug operation for the first particular hot plug device 12 based on data 150, initiate the pending hot plug operation, and update the status of the first particular hot plug device 12 with a value of "2" (i.e., ongoing hot plug operation) and the second particular hot plug device 12 with a value of "0" (i.e., no ongoing or pending hot plug operation). Upon or after completion of the hot plug operation for the first particular hot plug device 12, information handling system 10 may similarly update the status of the first particular hot plug device 12 with a value of "0" (i.e., no ongoing or pending hot plug operation).

Figure 4:
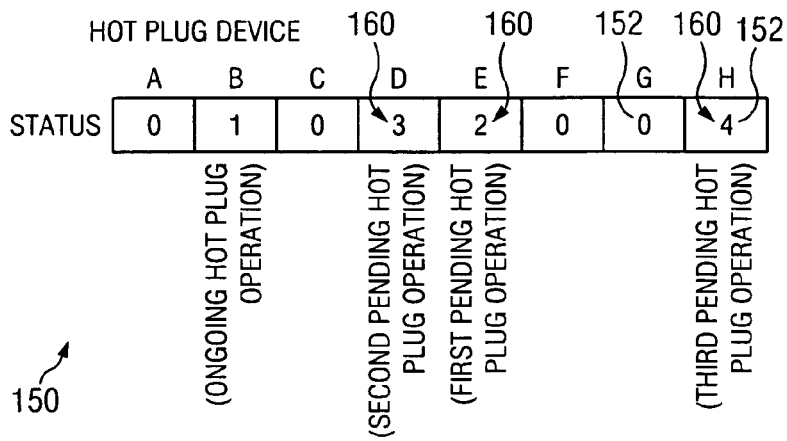
FIG. 4 illustrates example data including values representing the current status of a plurality of hot plug devices supported by the information handling system of FIG. 1 in accordance with another embodiment of the disclosure.

FIG. 4 illustrates example data 150 including values 152 representing the current status 154 of a plurality of hot plug devices 12 supported by information handling system 10 in accordance with another embodiment of the disclosure. In this embodiment, data 150 further indicates the timing or priority information 160 indicating the time or other priority of pending hot plug operations, such that if more than one hot plug operation is pending, the pending hot plug operations are executed in order according to one or more priority factors, such as the time that each pending hot plug operation, the type of the hot plug device 12, and the slot 62 in which the hot plug device 12 is located, for example.

For example, in the example embodiment shown in FIG. 4, which may be used in an embodiment including eight hot plug slots 62, a value of "0" for a particular hot plug device 12 indicates that a hot plug operation is neither currently ongoing nor pending for that hot plug device 12, and a value of "1" indicates that the hot plug device 12 is currently undergoing a hot plug operation. The values "2" through "8" indicate (a) that a hot plug operation is pending for the hot plug device 12 and (b) the priority of that pending hot plug operation relative to other currently pending hot plug operations. In particular, the lower the number 2-8, the higher the priority for that pending hot plug operation. Thus, a pending hot plug operation assigned a value of "2" will be executed before a pending hot plug operation assigned a value of "3," which in turn will be executed before a pending hot plug operation assigned a value of "4," and so on. Such values may be updated over time as ongoing hot plug operations are completed and pending hot plug operations are initiated. It should be understood that the values "0" through "8" are used merely for illustrative purposes, and any other suitable values may be used.

The values assigned to each pending hot plug operation may be determined by information handling system 10 based on any one or more priority factors, such as the time that each pending hot plug operation, the type of the hot plug device 12, and the slot 62 in which the hot plug device 12 is located, for example. For example, in a pure FIFO system, when a hot plug operation is ongoing, the first received request for another hot plug operation is assigned the value of "2," the next received request for another hot plug operation is assigned the value of "3," and so one. As another example, in an embodiment in which information handling system 10 supports both hot plug memory devices 14 and hot plug PCI devices 16, hot plug devices 12 may be given a higher priority such that a request for a hot plug operation for a hot plug device 12 is given a higher priority than a request for a hot plug operation for a hot plug PCI device 16, regardless of whether request was received first.

Figure 5:
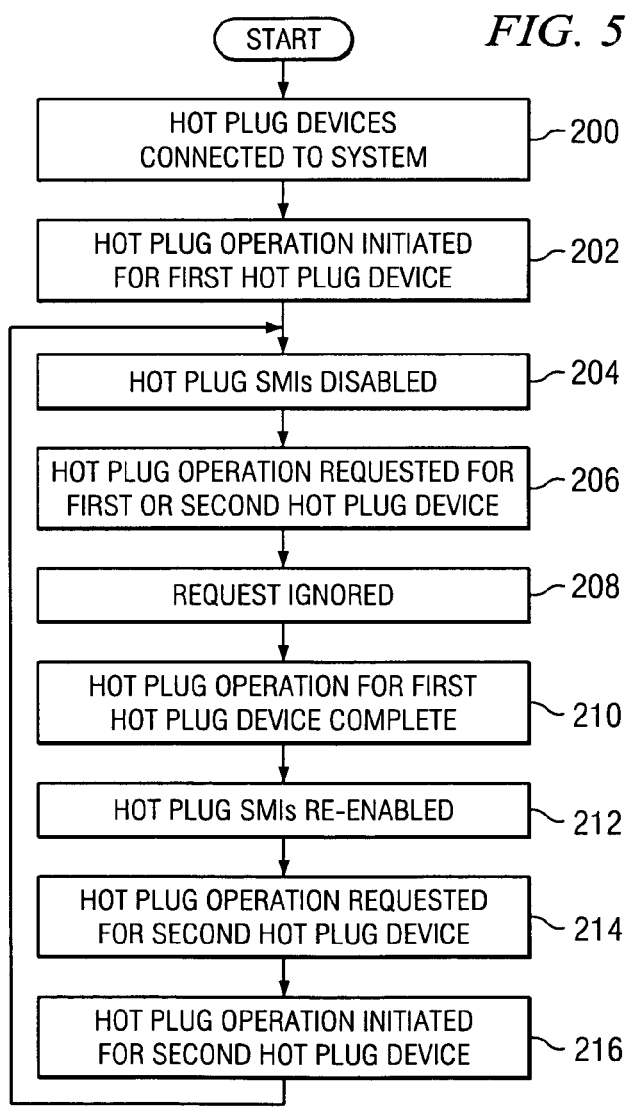
FIG. 5 illustrates a method of the information handling system of FIG. 1 managing multiple hot plug operations in accordance with one embodiment of the disclosure.

FIG. 5 illustrates a method of information handling system 10 managing multiple hot plug operations in accordance with one embodiment of the disclosure. In this embodiment, restricting the initiation of a new hot plug operation for a particular hot plug device 12 includes disabling hot plug SMIs from that hot plug device 12 and/or all other hot plug devices 12) during the ongoing hot plug operation, and re-enabling hot plug SMIs from that hot plug devices 12 and/or all other hot plug devices 12) after completion of the ongoing hot plug operation.

At step 200, a number of hot plug devices 12 are connected to information handling system 10, such as shown in FIG. 2, for example. At step 202, a user presses the attention button 108 on a first hot plug device 12, which generates a hot plug SMI signal, which is communicated to BIOS program 50. In response, BIOS program 50 initiates a hot plug operation for the first hot plug device 12. For example, the user may wish to add first hot plug device 12 to or remove first hot plug device 12 from information handling system 10. At step 204, in response to the hot plug operation being initiated for the first hot plug device 12, information handling system 10 disables hot plug SMIs from all hot plug devices 12 during the ongoing hot plug operation. For example, BIOS program 50 may communicate a command to the chipset 102 in each hot plug device 12 to ignore any hot plug SMIs until further notice.

At step 206, during the hot plug operation for the first hot plug device 12, the user (or anther user) presses the attention button 108 on either the first hot plug device 12 or a second hot plug device 12, which generates a hot plug SMI signal. At step 208, the hot plug SMI signal is ignored, based on the command implemented at step 204. Thus, the ongoing hot plug operation for the first hot plug device 12 continues through completion. At step 210, the hot plug operation for the first hot plug device 12 completes (and thus the first hot plug device 12 is either added to information handling system 10 or ready to be safely removed from information handling system 10). In some embodiments, an indication may be displayed (such as by a light or sound, for example) to the user indicating that the hot plug operation has completed for the first hot plug device 12. At step 212, in response to the completion of the ongoing hot plug operation, information handling system 10 re-enables hot plug SMIs from all hot plug devices 12. For example, BIOS program 50 may communicate a command to the chipset 102 in each hot plug device 12 to re-enable hot plug SMIs. Thus, hot plug operations may again be initiated for hot plug memory device 12. At step 214, a user presses the attention button 108 on a second hot plug device 12, which generates a hot plug SMI signal, which is communicated to BIOS program 50. In response, at step 216, BIOS program 50 initiates a hot plug operation for the first hot plug device 12. In addition, BIOS program 50 communicates a command to the chipset 102 in each hot plug device 12 to ignore any hot plug SMIs until further notice, such as described above at step 204.

In this manner, information handling system 10 may prevent multiple hot plug operations from overlapping, thus allowing ongoing hot plug operations to complete without interruption, thereby eliminating or reducing the likelihood of system hang.

FIGS. 6-7 illustrate a method of information handling system 10 managing multiple hot plug operations in accordance with another embodiment of the disclosure. In this embodiment, restricting the initiation of a new hot plug operation includes storing a received instruction for initiating the new hot plug operation such that the new hot plug operation is pending, and subsequently initiating the pending new hot plug operation upon or after completion of the ongoing hot plug operation.

In particular, information handling system 10 manages a current status for each hot plug device 12, which status is represented by values which may be stored within SMI code 104 on one or more hot plug devices 12. In this embodiment, such values include a first value "2" indicating that a hot plug operation is currently ongoing for that hot plug device 12, a second value "1" indicating that a hot plug operation is pending for that hot plug device 12, and a third value "0" indicating that a hot plug operation is neither currently ongoing nor pending for that hot plug device 12, such as discussed above with reference to FIG. 3.

At step 300, a number of hot plug devices 12A are connected to information handling system 10, such as shown in FIG. 2, for example. No hot plug operations are currently ongoing for any of the hot plug devices 12A, and thus a value of "0" is stored in SMI code 104 for each of the hot plug devices 12A in data 150, as shown in FIG. 7A. At step 302, a user presses the attention button 108 on a first hot plug device 12A (such as to add first hot plug device 12A to or remove first hot plug device 12A from information handling system 10), which generates an SMI signal that is communicated to BIOS program 50. In response, at step 304, BIOS program 50 checks the chipset 102 on each hot plug device 12 to determine (a) the reason for the SMI signal, and (b) the hot plug status of each hot plug device 12. Based on this check, at step 306, BIOS program 50 determines that the SMI signal from first hot plug device 12A is a hot plug SMI, and updates the value stored in SMI code 104 for each hot plug device 12, including updating the value for the first hot plug device 12A from "0" to "2," as shown in FIG. 7B. BIOS program 50 then initiates the requested hot plug operation for first hot plug device 12 at step 308.

During the hot plug operation for the first hot plug device 12A, the user (or another user) presses the attention button 108 on either the first hot plug device 12A or a second hot plug device 12B. As shown in FIG. 6, the method splits at this point depending upon whether the attention button 108 was pressed on first hot plug device 12A or second hot plug device 12B. If the attention button 108 on first hot plug device 12A is pressed, the method continues to step 310. If the attention button 108 on second hot plug device 12B is pressed, the method continues to step 320.

At step 310, the user (or anther user) presses the attention button 108 on first hot plug device 12A, which generates a hot plug SMI signal that is communicated to BIOS program 50. In response, at step 312, BIOS program 50 checks the chipset 102 on each hot plug device 12 to determine (a) the reason for the SMI signal, and (b) the hot plug status of each hot plug device 12. Based on this check, at step 314, BIOS program 50 determines (a) that the SMI signal from first hot plug device 12A is a hot plug SMI and (b) that first hot plug device 12A is already undergoing a hot plug operation. In response, at step 316, BIOS program 50 ignores the hot plug SMI signal and allows the ongoing hot plug operation to continue for first hot plug device 12A. At step 318, once the hot plug operation for first hot plug device 12A is complete, BIOS program 50 updates the value stored in SMI code 104 for the first hot plug device 12A from "2" to "0," thus returning to the state shown in FIG. 7A.

At step 320, the user (or anther user) presses the attention button 108 on a second hot plug device 12B (such as to add second hot plug device 12B to or remove second hot plug device 12B from information handling system 10), which generates an SMI signal that is communicated to BIOS program 50. In response, at step 322, BIOS program 50 checks the chipset 102 on each hot plug device 12 to determine (a) the reason for the SMI signal, and (b) the hot plug status of each hot plug device 12. Based on this check, at step 324, BIOS program 50 determines (a) that the SMI signal from second hot plug device 12B is a hot plug SMI and (b) that another hot plug device 12 (first hot plug device 12A) is already undergoing a hot plug operation. In response, at step 326, BIOS program 50 (a) delays initiation of the requested hot plug operation for second hot plug device 12B and (b) updates the value stored in SMI code 104 for each hot plug device 12, including updating the value for the second hot plug device 12B from "0" to "1," as shown in FIG. 7C.

At step 328, the ongoing hot plug operation for first hot plug device 12A completes. In response, at step 330, BIOS program 50 checks the chipset 102 on each hot plug device 12 to determine whether there are any pending hot plug operations. Based on this check, at step 332, BIOS identifies the pending hot plug operation for second hot plug device 12B, and updates the value stored in SMI code 104 for each hot plug device 12, including updating the value for first hot plug device 12A from "2" to "0" and the value for second hot plug device 12B from "1" to "2," as shown in FIG. 7D. BIOS program 50 then initiates the requested hot plug operation for second hot plug device 12B at step 334.

In this manner, requests for a new hot plug operation (or requests for multiple new hot plug operations) that is made while another hot plug operation is ongoing are queued by system 10 and performed after the ongoing hot plug operation is finished. Thus, requested hot plug operations may be maintained (i.e., not lost) and performed in a suitable order, without causing system hang or other errors, and allowing ongoing hot plug operations to finish without interruption. As discussed above, queued hot plug operations may be queued according to any suitable criteria, such as the time that the request for each pending hot plug operation was received, the type of the relevant hot plug device, and the slot in which the relevant hot plug device is located, for example. System 10 may be configured for any desired priority of hot plug operations.

Although the disclosed embodiments have been described in detail, it should be understood that various changes, substitutions and alterations can be made to the embodiments without departing from their spirit and scope.

What is claimed is:

1. A method for managing multiple hot plug operations in an information handling system, comprising:
   receiving a hot plug system management interrupt (SMI) signal for initiating a new hot plug operation, the SMI signal being received from a chipset included in a first hot plug device connected to the information handling system, the SMI signal generated by the chipset in response to user input via a user input device on the first hot plug device;
   in response to receiving the SMI signal from the first hot plug device, checking chipsets included in each of one or more other hot plug devices connected to the information handling system to determine whether another hot plug operation is currently ongoing for another hot plug device;
   as a result of checking the chipsets of the one or more other hot plug devices, identifying another hot plug operation currently ongoing for another hot plug device at the time of receiving the instruction from the first hot plug device for initiating the new hot plug operation, the ongoing hot plug operation including one or more hot plug SMIs; and
   in response to identifying the ongoing hot plug operation, restricting the initiation of the new hot plug operation such that the ongoing hot plug operation may be completed.

2. The method of claim 1, wherein the user input device comprises an attention button on the first hot plug device.

3. The method of claim 1, wherein:
   restricting the initiation of the new hot plug operation such that the ongoing hot plug operation may be completed comprises:
   disabling any hot plug SMIs from the first hot plug device during the ongoing hot plug operation; and
   re-enabling hot plug SMIs from the first hot plug device after completion of the ongoing hot plug operation.

4. The method of claim 1, wherein restricting the initiation of the new hot plug operation such that the ongoing hot plug operation may be completed comprises:
   storing the received (SMI) signal for initiating the new hot plug operation such that the new hot plug operation is pending; and
   upon completion of the ongoing hot plug operation, initiating the pending new hot plug operation.

5. The method of claim 1, further comprising:
   managing a current status for each of a plurality of hot plug devices, the current status of each hot plug device indicating at least whether a hot plug operation is currently ongoing for that device and whether a hot plug operation is pending for that device;

wherein identifying an ongoing hot plug operation comprises:
    accessing chipsets included in each of the hot plug devices to determine the status of the plurality of hot plug devices; and
    determining, based on the accessed status of the plurality of hot plug devices, that a hot plug operation is currently ongoing for a second hot plug device;
wherein restricting the initiation of the new hot plug operation such that the ongoing hot plug operation may be completed comprises updating the status of the first hot plug device associated with the new hot plug operation to indicate that a hot plug operation is pending for the first hot plug device; and
upon completion of the ongoing hot plug operation, initiating the pending hot plug operation for the first hot plug device.

6. The method of claim 5, further comprising, upon completion of the ongoing hot plug operation:
    updating the status of the second hot plug device to indicate that a hot plug operation is not ongoing or pending for the second hot plug device; and
    updating the status of the first hot plug device to indicate that a hot plug operation is ongoing for the first device.

7. The method of claim 5, wherein:
the current status of each of the plurality of hot plug devices is identified by one of a plurality of values including a first value indicating that a hot plug operation is currently ongoing for that device, a second value indicating that a hot plug operation is pending for that device, and a third value indicating that a hot plug operation is neither currently ongoing nor pending for that device; and
managing the current status for each of a plurality of hot plug devices comprises updating the current status for particular hot plug devices as appropriate.

8. An information handling system operable to manage multiple hot plug operations, comprising:
    a plurality of hot plug slots operable to receive hot plug devices;
    a processor;
    a BIOS memory communicatively coupled to the processor and including a BIOS program;
    wherein the processor and the BIOS program are operable to cooperate to:
        receive a hot plug system management interrupt (SMI) signal for initiating a new hot plug operation for a particular hot plug device in a particular hot plug slot, the SMI signal being received from a chipset included in the particular hot plug device, the SMI signal generated by the chipset in response to user input via a user input device on the particular hot plug device;
        in response to receiving the SMI signal from the particular hot plug device, check chipsets included in hot plug devices in one or more of the other hot plug slots to determine whether another hot plug operation is currently ongoing for another hot plug device;
        as a result of checking the chipsets of the one or more other hot plug devices, identify another hot plug operation currently ongoing for another hot plug device at the time of receiving the instruction from the particular hot plug device for initiating the new hot plug operation, the ongoing hot plug operation including one or more hot plug SMIs; and
        in response to identifying the ongoing hot plug operation, restrict the initiation of the new hot plug operation such that the ongoing hot plug operation may be completed.

9. The information handling system of claim 8, wherein:
the processor and the BIOS program are operable to cooperate to restricting the initiation of the new hot plug operation by:
    disabling any hot plug SMIs from the particular hot plug device during the ongoing hot plug operation; and
    re-enabling hot plug SMIs from the particular hot plug device after completion of the ongoing hot plug operation.

10. The information handling system of claim 8, wherein restricting the initiation of the new hot plug operation such that the ongoing hot plug operation may be completed includes:
    storing the received SMI signal for initiating the new hot plug operation such that the new hot plug operation is pending; and
    upon completion of the ongoing hot plug operation, initiating the pending new hot plug operation.

11. The information handling system of claim 8, wherein:
the processor and the BIOS program are further operable to cooperate to manage a current status for each of a plurality of hot plug devices, the current status of each hot plug device indicating at least whether a hot plug operation is currently ongoing for that device and whether a hot plug operation is pending for that device;
identifying an ongoing hot plug operation comprises:
    accessing chipsets included in each of the hot plug devices to determine the status of the plurality of hot plug devices; and
    determining, based on the accessed status of the plurality of hot plug devices, that a hot plug operation is currently ongoing for a second hot plug device;
restricting the initiation of the new hot plug operation such that the ongoing hot plug operation may be completed comprises updating the status of the particular hot plug device associated with the new hot plug operation to indicate that a hot plug operation is pending for the particular hot plug device; and
the processor and the BIOS program are further operable to upon completion of the ongoing hot plug operation, initiating the pending hot plug operation for the particular hot plug device.

12. The information handling system of claim 11, wherein:
the current status of each of the plurality of hot plug devices is identified by one of a plurality of values including a first value indicating that a hot plug operation is currently ongoing for that device, a second value indicating that a hot plug operation is pending for that device, and a third value indicating that a hot plug operation is neither currently ongoing nor pending for that device; and
managing the current status for each of a plurality of hot plug devices comprises updating the current status for particular hot plug devices as appropriate.

13. A computer-readable medium having computer-executable instructions for managing multiple hot plug operations in an information handling system, comprising:
    instructions for identifying a received hot plug system management interrupt (SMI) signal for initiating a new hot plug operation, the SMI signal being received from a chipset included in a first hot plug device connected to the information handling system, the SMI signal generated by the chipset in response to user input via a user input device on the first hot plug device;

instructions for, in response to receiving the SMI signal from the first hot plug device, checking chipsets included in each of one or more other hot plug devices connected to the information handling system to determine whether another hot plug operation is currently ongoing for another hot plug device;

instructions for, as a result of checking the chipsets of the one or more other hot plug devices, identifying another hot plug operation currently ongoing for another hot plug device at the time of receiving the instruction from the first hot plug device for initiating the new hot plug operation, the ongoing hot plug operation including one or more hot plug SMIs; and instructions for restricting the initiation of the new hot plug operation in response to identifying the ongoing hot plug operation such that the ongoing hot plug operation may be completed.

14. The computer-readable medium of claim 13, wherein:

the instructions for restricting the initiation of the new hot plug operation such that the ongoing hot plug operation may be completed include:

instructions for disabling any hot plug SMIs from the first hot plug device during the ongoing hot plug operation; and instructions for re-enabling hot plug SMIs from the first hot plug device after completion of the ongoing hot plug operation.

15. The computer-readable medium of claim 13, wherein the instructions for restricting the initiation of the new hot plug operation such that the ongoing hot plug operation may be completed include:

instructions for storing the received SMI signal for initiating the new hot plug operation such that the new hot plug operation is pending; and instructions for upon completion of the ongoing hot plug operation, initiating the pending new hot plug operation.

16. The computer-readable medium of claim 13, further comprising:

instructions for maintaining a status for each of a plurality of hot plug devices, the status of each hot plug device indicating at least whether a hot plug operation is currently ongoing for that device and whether a hot plug operation is pending for that device;

wherein instructions for identifying an ongoing hot plug operation include:

instructions for accessing chipsets included in each of the hot plug devices to determine the status of the plurality of hot plug devices; and instructions for determining, based on the accessed status of the plurality of hot plug devices, that a hot plug operation is currently ongoing for a second hot plug device;

wherein instructions for restricting the initiation of the new hot plug operation such that the ongoing hot plug operation may be completed include instructions for updating the status of the first hot plug device associated with the new hot plug operation to indicate that a hot plug operation is pending for the first hot plug device; and instructions for initiating the pending hot plug operation for the first hot plug device upon completion of the ongoing hot plug operation.

* * * * *